US008771898B2

(12) United States Patent
Sugiura et al.

(10) Patent No.: US 8,771,898 B2
(45) Date of Patent: Jul. 8, 2014

(54) ARRANGEMENT OF COMPONENTS IN A SOLID OXIDE FUEL CELL AND MANUFACTURING METHOD THEREOF

(75) Inventors: Kei Sugiura, Tokyo (JP); Atsushi Hitomi, Tokyo (JP); Takeshi Urano, Tokyo (JP); Hitoshi Takamura, Miyagi (JP)

(73) Assignees: TDK Corporation, Tokyo (JP); Tohoku University, Sendai (JP)

( * ) Notice: Subject to any disclaimer, the term of this patent is extended or adjusted under 35 U.S.C. 154(b) by 401 days.

(21) Appl. No.: 12/752,700

(22) Filed: Apr. 1, 2010

(65) Prior Publication Data
US 2011/0027693 A1 Feb. 3, 2011

(30) Foreign Application Priority Data
Jul. 29, 2009 (JP) ................................. 2009-176943

(51) Int. Cl.
*H01M 8/10* (2006.01)
(52) U.S. Cl.
USPC ............ 429/495; 429/456; 429/455; 429/523
(58) Field of Classification Search
USPC ......... 429/495, 491, 523, 529, 456, 452, 455, 429/465; 156/89.12, 243
See application file for complete search history.

(56) References Cited

U.S. PATENT DOCUMENTS 6,042,955 A * 3/2000 Okamoto ...................... 429/413
7,851,105 B2 * 12/2010 Farrington et al. ........... 429/512
2004/0018406 A1 1/2004 Herman et al.
2007/0042261 A1 * 2/2007 Kohyama et al. .............. 429/44
2008/0096080 A1 * 4/2008 Batawi et al. ................... 429/33

FOREIGN PATENT DOCUMENTS

| JP | A-2003-297387 | 10/2003 |
| JP | A-2004-31158 | 1/2004 |
| JP | A-2004-55564 | 2/2004 |
| JP | A-2006-253090 | 9/2006 |
| JP | A-2006-351253 | 12/2006 |
| JP | A-2007-240085 | 9/2007 |
| WO | WO 2008/056958 | 5/2008 |

OTHER PUBLICATIONS

Jul. 31, 2013 Office Action issued in Japanese Patent Application No. 2009-176943 (translation).

* cited by examiner

*Primary Examiner* — Raymond Alejandro
(74) *Attorney, Agent, or Firm* — Oliff PLC

(57) ABSTRACT

Described herein are solid oxide fuel cells and manufacturing methods thereof. In certain aspects, the solid oxide fuel cells described herein include a plurality of anodes and a plurality of cathodes in which the anodes and cathodes are alternately stacked on each other and have non-overlapping sections in which the anodes and cathodes do not overlap partially. In certain aspects, the plurality of anodes are electrically connected to a first electrode, and the plurality of cathodes are electrically connected to a second electrode. In certain aspects, a solid electrolyte can be included, for example, between the anode and the cathode. In certain aspects, partitioning sections are disposed between each of the cathodes and the first electrode and between each of the anodes and the second electrode.

11 Claims, 12 Drawing Sheets

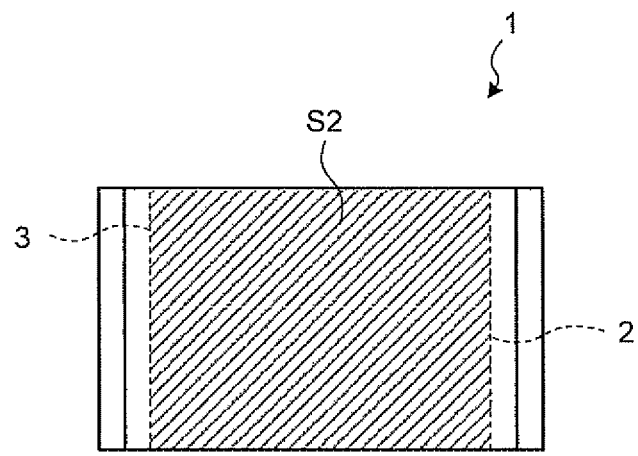
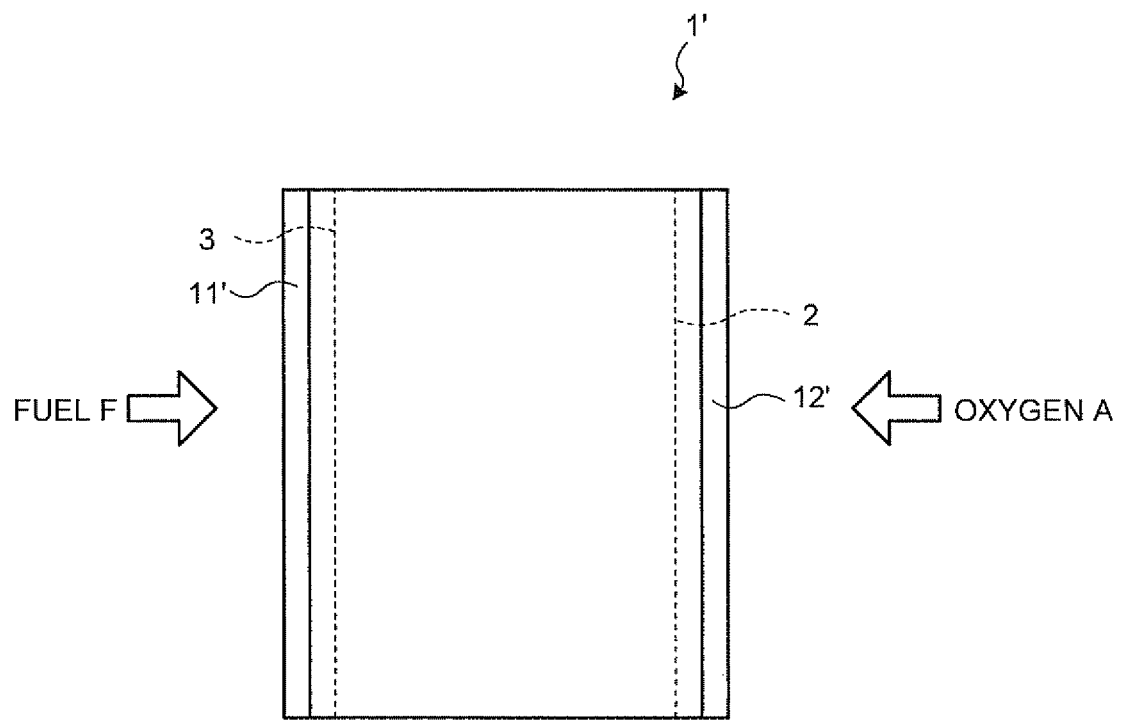

US 8,771,898 B2

ARRANGEMENT OF COMPONENTS IN A SOLID OXIDE FUEL CELL AND MANUFACTURING METHOD THEREOF

CROSS-REFERENCE TO RELATED APPLICATIONS

This application is based upon and claims the benefit of priority from Japanese Patent Application No. 2009-176943, filed Jul. 29, 2009, the entire contents of which are incorporated herein by reference.

BACKGROUND OF THE INVENTION

1. Field of the Invention

The present invention relates to a solid oxide fuel cell.

2. Description of the Related Art

Fuel cells are attracting much attention as environment-friendly energy, and it is thus expected that fuel cells will be put to practical use for various fields such as a fuel cell vehicle, a home cogeneration system, and a small-sized power supply for a mobile phone. While there are various types of fuel cells, a sold oxide fuel cell (SOFC) is advantageous in that its energy efficiency is high and the SOFC may be manufactured at low cost because noble metals are not used. For example, Japanese Patent Application Laid-open No. 2006-253090 discloses an SOFC in which air and fuel are supplied from an upper part of a housing section surrounding and housing the SOFC.

However, as illustrated in FIG. 1 of Japanese Patent Application Laid-open No. 2006-253090, when fuel and air are separately supplied to an anode and a cathode of each cell from the same direction in plural solid oxide fuel cells (SOFCs) contained in a housing section, a fuel supplying apparatus and an air supplying apparatus are required. Since the SOFC has a structure where a solid electrolyte is inserted between the anode and the cathode, supplying systems of fuel and air become complicated for separately supplying the fuel and air to each of the neighbored anode and cathode, which makes it difficult to realize miniaturization. As illustrated in FIG. 2 of Japanese Patent Application Laid-open No. 2006-253090, when a gas mixture of fuel and air is supplied from the same direction to each cell of the plural SOFCs contained in the receiving section, generation efficiency is deteriorated.

SUMMARY OF THE INVENTION

A solid oxide fuel cell according to an aspect of the present invention includes a plurality of anodes and a plurality of cathodes alternately stacked on each other so as to provide non-overlapping sections where the anodes and cathodes do not overlap partially; solid electrolytes disposed at least between the anodes and the cathodes; and partitioning sections disposed at the non-overlapping sections between the neighbored solid electrolytes, and connecting the solid electrolytes to each other. The plurality of anodes, the plurality of cathodes, the solid electrolytes, and the partitioning sections are integrally formed.

A solid oxide fuel cell according to another aspect of the present invention includes a plurality of anodes arranged at predetermined intervals; a plurality of cathodes facing the anodes, respectively, and alternately stacked with the anodes; a first electrode electrically connected to the plurality of anodes; a second electrode on the opposite of the first electrode, and electrically connected to the plurality of cathodes; solid electrolytes disposed at least between the anodes and the cathodes; and partitioning sections disposed between each of the cathodes and the first electrode, and between each of the anodes and the second electrode. The plurality of anodes, the plurality of cathodes, the first electrode, the second electrode, the solid electrolytes, and the partitioning sections are integrally formed.

A method of manufacturing a solid oxide fuel cell according to still another aspect of the present invention includes preparing a solid electrolyte slurry and an electrode slurry; applying the solid electrolyte slurry to form a green sheet; applying the electrode slurry on the green sheet while leaving a margin section, and forming a margin layer in the margin section to form a unit sheet; stacking the unit sheets to form a stacked body; pressing the stacked body and cutting the pressed stacked body to prepare a product unit stacked body; drying the product unit stacked body; and firing the dried product unit stacked body.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a view illustrating an area of a portion contributing to generation in the SOFC according to the embodiment;

FIG. 6 is a plan view illustrating a structure of an SOFC according to a modification of the embodiment;

DETAILED DESCRIPTION OF THE PREFERRED EMBODIMENTS

Exemplary embodiments of the present invention will be described in detail with reference to accompanying drawings. Further, the present invention is not limited by following embodiments for implementing the present invention (hereinafter, referred to as embodiments). Also, elements in the following embodiments include equivalents thereof, for example, elements easily deduced by a person having ordinary skill in the art, and elements substantially identical thereto.

Figure 1:
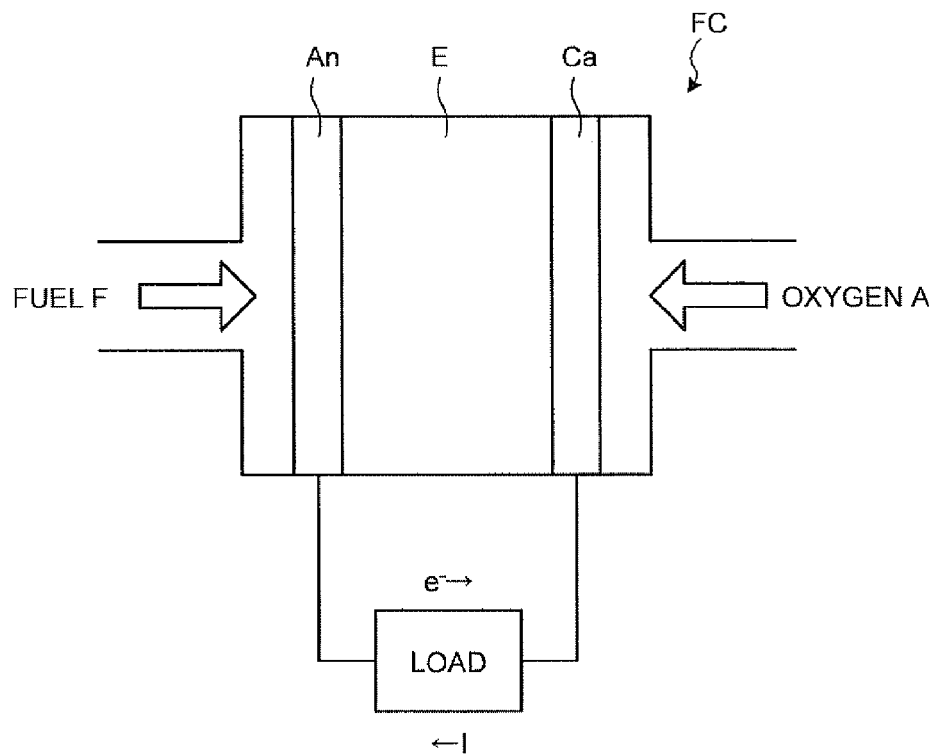
FIG. 1 is a schematic view of a fuel cell.

FIG. 1 is a schematic view of a fuel cell. The general operating principle of a fuel cell will be described with reference to FIG. 1. A fuel cell FC is a power generating device that directly converts chemical energy of fuel into electrical energy through electrochemical reaction between hydrogen contained in the fuel and oxygen contained in air. Such electrochemical reaction is a reverse reaction of water electrolysis. Oxygen A receives electrons $e^-$ from an external circuit at a cathode (air electrode) Ca to be changed into oxygen ion $O^{2-}$, and then the oxygen ion $O^{2-}$ moves to an anode (fuel electrode) An through an electrolyte E. At the anode An, the oxygen ion $O^{2-}$ reacts with the fuel F (hydrogen $H_2$) supplied from the outside so that two electrons $e^-$ are transferred to anode. These electrons $e^-$ flow to the opposite cathode Ca through an external circuit. Hydrogen $H_2$ bonds with oxygen ion $O^{2-}$ having a negative charge, thereby producing water. This will be expressed as Chemical Equations below.

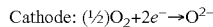

Cathode: $(\frac{1}{2})O_2 + 2e^- \rightarrow O^{2-}$

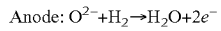

Anode: $O^{2-} + H_2 \rightarrow H_2O + 2e^-$

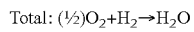

Total: $(\frac{1}{2})O_2 + H_2 \rightarrow H_2O$

While a fuel cell used in an embodiment is a solid oxide fuel cell (SOFC), the SOFC may use, for example, CO, besides $H_2$ as fuel.

The SOFC has high generation efficiency. Also, when the SOFC operates under a high-temperature condition ranging from 800° C. to 1,000° C., the ionic conductivity of a solid electrolyte is low, e.g., $10^{-1}$ Scm$^{-1}$ in general. Thus, to sufficiently obtain electric current, it is necessary to increase the effective electrode area and to form the solid electrolyte in thin layer. The SOFC according to an embodiment generates high current by increasing an effective electrode area per unit volume in comparison with conventional flat and tubular SOFCs. Hence, the SOFC according to an embodiment has a multi-layered structure where an electrode (anode or cathode) and a solid electrolyte are alternately stacked on each other so that the effective electrode area per unit volume is increased and miniaturization is realized as well. Herebelow, a fuel cell according to an embodiment will be described in more details.

Figure 2:
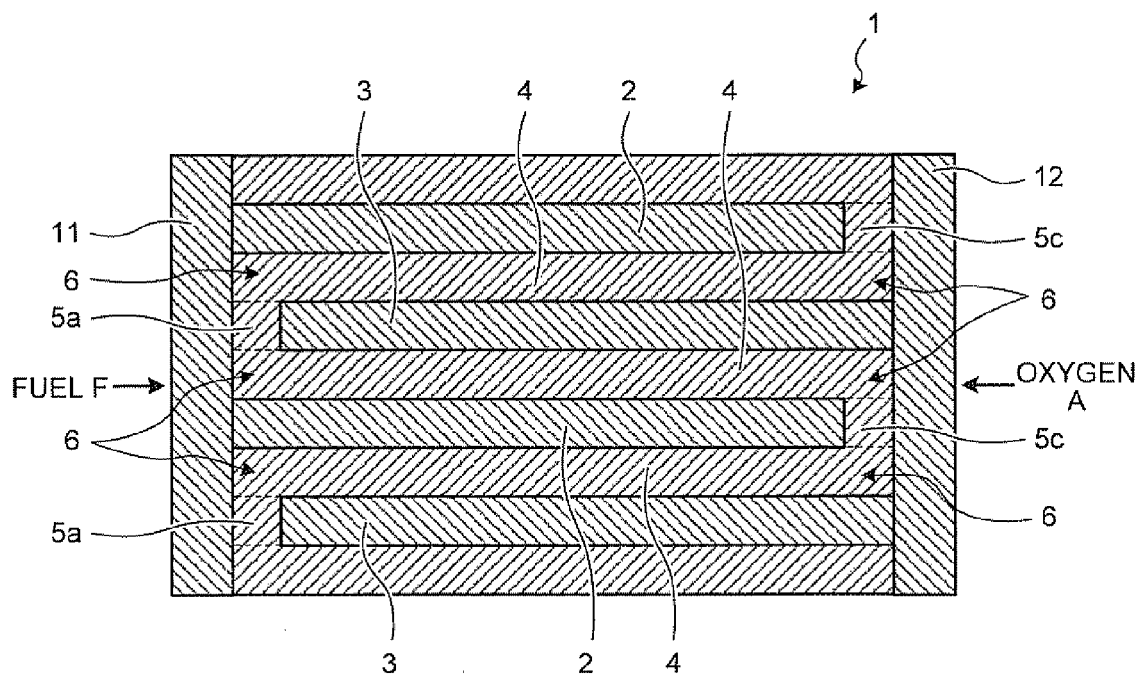
FIG. 2 is a cross-sectional view illustrating a structure of a solid oxide fuel cell (SOFC) according to an embodiment.
Figure 3:
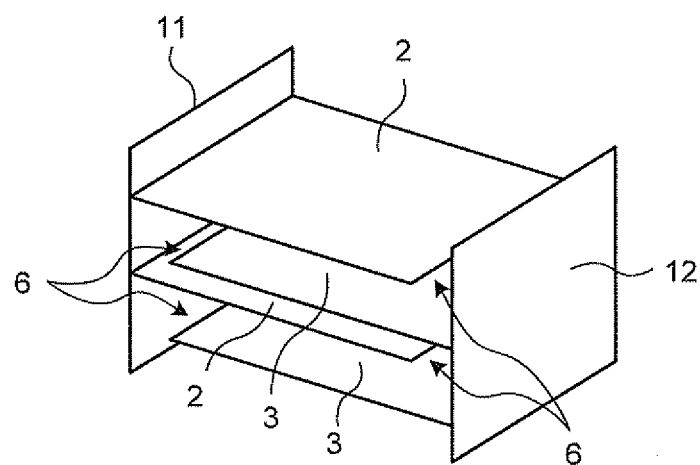
FIG. 3 is a perspective view illustrating a construction of an anode and a cathode included in an SOFC according to the embodiment.

FIG. 2 is a cross-sectional view illustrating a structure of the SOFC according to the embodiment. FIG. 3 is a perspective view illustrating a construction of an anode and a cathode included in the SOFC according to the embodiment. As illustrate in FIG. 2, an SOFC 1 includes plural anodes 2, plural cathodes 3, solid electrolyte 4 disposed at least between the anode 2 and the cathode 3, and partitioning sections 5a and 5c disposed between the neighbored solid electrolytes 4.

In this embodiment, the plural anodes 2, the plural cathodes 3, the solid electrolytes 4, and the partitioning sections 5a and 5c are integrally constructed to form the SOFC 1. Here, the SOFC 1 according to the embodiment further includes a first electrode 11 electrically connected to the plural anodes 2, and a second electrode 12 electrically connected to the plural cathodes 3. On this wise, the SOFC 1 may further include the first and the second electrodes 11 and 12.

As illustrated in FIGS. 2 and 3, the plural anodes 2 and the plural cathodes 3 included in the SOFC 1 are arranged at regular intervals, and alternately stacked on each other while having non-overlapping sections 6 where the anode 2 and the cathode 3 do not overlap partially. The anode 2 and the cathode 3 are disposed facing each other. As illustrated in FIG. 2, the solid electrolyte 4 is disposed at least between the anode 2 and the cathode 3. Also, in the SOFC 1, the partitioning sections 5a and 5c are installed at the non-overlapping section 6 between the neighbored solid electrolytes 4. Here, the partitioning section 5a is installed on the non-overlapping section 6 at the side of the first electrode 11, and the partitioning section 5c is installed on the non-overlapping section 6 at the side of the second electrode 12. The plural anodes 2 are electrically connected to the first electrode 11, and the plural cathodes 3 are electrically connected to the second electrode 12.

As such, in the SOFC 1, the anode 2 and the cathode 3 are isolated from each other by means of the partitioning sections 5a and 5c. Also, the plural anodes 2 are electrically connected to the first electrode 11, and the plural cathodes 3 are electrically connected to the second electrode 12 on the opposite of the first electrode 11. For this reason, fuel F may be supplied to the first electrode 11, and oxygen A may be supplied to the second electrode 12 disposed opposite to the first electrode 11. Resultantly, a supplying system of fuel F and a supplying system of oxygen A may be constructed easily and simply.

In this embodiment, respectively, the anode 2 and the cathode 3 are porous materials made of platinum (Pt). The first electrode 11 and the second electrode 12 are porous materials made of the same material as the anode 2 and the cathode 3, that is, Pt. The SOFC 1 operates in such a way that the fuel F (e.g., hydrogen) is supplied to the first electrode 11, and the oxygen A (e.g., air in this embodiment) is supplied to the second electrode 12. In order that the fuel F supplied to the first electrode 11 and the oxygen A supplied to the second electrode 12 may widely spread inside the anode 2 and the cathode 3 and reach the solid electrolyte 4, the first electrode 11, the anode 2, the second electrode 12 and the cathode 3 are made of porous materials. Consequently, the fuel F and oxygen A reach the solid electrolyte 4 reliably. Therefore, the SOFC 1 operates reliably, and the fuel F and oxygen A widely spread over the anode 2 and the cathode 3 entirely and react, thereby generating much more power.

The anode 2 may use a material having electronic conductivity at high-temperature in reductive atmosphere besides Pt. Such a material may include, for example, NiO (metalized on the surface or up to the inside of NiO in reductive atmosphere) and Ni/SDC cermet. Here, SDC as a ceria-based electrolyte material is a material obtained by doping ceria ($CeO_2$) with samaria ($Sm_2O_3$). The cathode 3 may use, in addition to Pt, a material having electronic conductivity at high temperature in oxidative atmosphere. Such a material may include, for example, $CoFe_2O_4$, $MnFe_2O_4$, $NiFe_2O_4$, and BSCF. Here, the BSCF represents a compound composed of barium (Ba), strontium (Sr), cobalt (Co), and iron (Fe).

The anode 2 and the cathode 3 are sufficient to have a function to allow the fuel F and the oxygen A to spread inside thereof, respectively, and thus they may not be made of porous materials if they have these functions. For example, the anode 2 and the cathode 3 may use hydrogen permeable materials allowing hydrogen to permeate the anode 2 or oxygen permeable materials (e.g., oxygen permeation membrane) allowing oxygen to permeate the cathode 3. In this case, non-porous hydrogen permeable material or oxygen permeable material (e.g., oxygen permeation membrane) is used for the anode 2 or the cathode 3, and a porous material may be used for the other one of the anode 2 or the cathode 3. Like this, in the embodiment, it is sufficient that at least one of the anode 2 and the cathode 3 is made of porous materials. Materials of the anode 2 and the cathode 3 are not limited to the above, and thus all materials applicable to the anode and cathode of the SOFC may also be used.

Although the anode 2 and the cathode 3 are made of the same material (porous Pt) in this embodiment, the anode 2 and the cathode 3 may be made of different materials. Further, it is sufficient that the first electrode 11 is electrically connected to the plural anodes 2 and the second electrode 12 is electrically connected to the plural cathodes 3. Thus, the first electrode 11 and the anode 2 may be made of different materials, and the second electrode 12 and the cathode 3 may be made of different materials. Consequently, more appropriate materials may be used for the anode 2 or the first electrode 11.

The solid electrolyte 4 may use a ceria-based material such as $Ce_{0.85}Sm_{0.15}O_{2-\delta}$, a stabilized zirconia-based material such as $Zr_{0.81}Y_{0.19}O_{2-\delta}$, or a perovskite-type oxide material such as $La_{0.8}Sr_{0.2}Ga_{0.8}Mg_{0.2}O_{3-\delta}$. Also, materials for the solid electrolyte 4 are not limited to the above, and thus all materials applicable to the solid electrolyte 4 of the SOFC may also be used.

As described above, in this embodiment, the partitioning sections 5a and 5c are disposed at the non-overlapping sections 6 between the neighbored solid electrolytes 4, and are in connection with the neighbored solid electrolytes 4. In case where the first and the second electrodes 11 and 12 are formed in the SOFC 1, the partitioning sections 5a are disposed between each of the cathodes 3 and the first electrode 11, and the partitioning sections 5c are disposed between each of the anodes 2 and the second electrode 12. Here, when the leakage of electrons or gas (fuel F or oxygen A) is occurred between the anode 2 and the cathode 3, the generation efficiency of the SOFC 1 is deteriorated. Therefore, it is preferable that the portion between anode 2 and the cathode 3 are made gas-tightly (gas is not permeable) and electron-insulatedly.

In this embodiment, the partitioning sections 5a and 5c are disposed between each of the cathodes 3 and the first electrode 11, and between each of the anodes 2 and the second electrode 12, respectively, and the partitioning sections 5a and 5c are also in connection with the solid electrolyte 4 neighbored thereto. Consequently, the SOFC 1 guarantees the electron insulation and air-tightness between the anode 2 and the cathode 3. The partitioning sections 5a and 5c are made of a material capable of securing the electronic insulation and gas-tightness. In this embodiment, the partitioning sections 5a and 5c are made of the same material as the solid electrolyte 4. Hence, the electronic insulation and gas-tightness is ensured, which suppresses the performance degradation of the SOFC 1. The partitioning sections 5a and 5c require the electronic insulation and gas-tightness, however, may not have the perfect electronic insulation and gas-tightness. For example, some leakages of electrons or gas may be tolerated if the leakage amount is an allowable range that the SOFC 1 performs its function and exhibits its performance.

Here, it is easy to manufacture the SOFC 1 because the solid electrolyte 4 and the partitioning sections 5a and 5c are made of the same material. Also, the solid electrolyte 4 and the partitioning sections 5a and 5c may be made of different materials. By using a material that is easy to further secure the electronic insulation and gas-tightness, the performance degradation of the SOFC 1 may be more effectively suppressed.

Materials used for the partitioning sections 5a and 5c may include, for example, a zirconia (zirconium dioxide, $ZrO_2$), alumina (aluminum oxide, $Al_2O_3$), silica (silicon dioxide, $SiO_2$), and magnesia (magnesium oxide, MgO). In particular, it is preferable that the partitioning sections 5a and 5c are made of a material having electronic conductivity lower than the solid electrolyte 4 from the viewpoint of improvement of generation efficiency. Such a material may be zirconium oxide.

Figure 4:
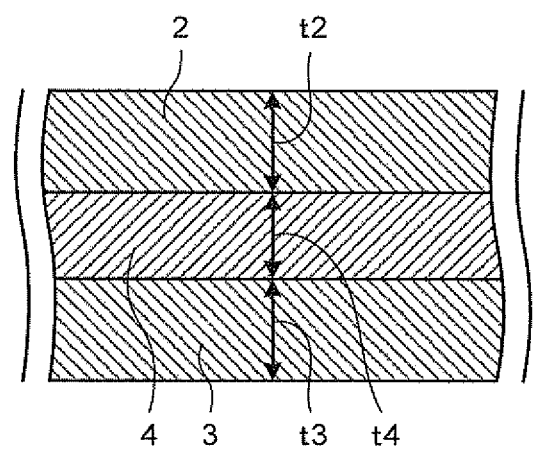
FIG. 4 is a partial cross-sectional view illustrating the SOFC according to the embodiment.

FIG. 4 is a partial cross-sectional view illustrating a structure of the SOFC according to the embodiment. As stated above, it is preferable that the solid electrolyte 4 (see FIG. 4) has the thickness t4 as thin as possible. A sample manufactured according to the embodiment had the thickness t4 ranging from 10 μm to 35 μm. It is not preferable to make the thickness t2 of the anode 2 and the thickness t3 of the cathode 3 to be excessively thin because the fuel F and oxygen A pass through the anode 2 and the cathode 3, respectively. In the sample manufactured according to the embodiment, the thicknesses t2 and t3 were in the range of 25 μm to 40 μm.

As described later, the SOFC 1 may be obtained by printing a green sheet forming the solid electrolyte 4, or the anode 2 and the cathode 3, stacking the green sheets, and firing the stacked green body. Therefore, it is relatively easy to control the thickness t4 of the solid electrolyte 4, the thickness t2 of the anode 2, and the thickness t3 of the cathode 3, and to make them into thin layer. Through the above-described manufacturing process, the solid electrolyte 4 is densely attached toward the anode 2 and the cathode 3 so that they are integrally constructed into one body.

FIG. 5 illustrates an area of a portion contributing to generation in the SOFC according to the embodiment. The SOFC 1 generates power through the combination (hereinafter, referred to as generation unit) of one anode 2, one cathode 3, and the solid electrolyte 4 therebetween. This generation unit has a theoretical open-circuit voltage of 1.14 V. In this embodiment, while the SOFC 1 is configured with the plural anodes 2 and the plural cathodes 3, each of the anodes 2 is electrically connected to the first electrode 11, and each of the cathodes 3 is electrically connected to the second electrode 12. That is, it may be regarded that the SOFC 1 is configured with plural generation units connected in parallel. Thus, the theoretical open-circuit voltage of the SOFC 1 is 1.14 V. Since the whole SOFC 1 is configured with one pair of the anode 2 electrically connected to the first electrode 11 and the cathode 3 electrically connected to the second electrode 12, the SOFC 1 does not have a component corresponding to an interconnector. The SOFC 1 may be regarded as a unit cell in a typical fuel cell.

In the SOFC 1 illustrated in FIG. 5, an area (hereinafter, referred to as an effective electrode area) of one generation unit contributing to generation is the area S2 of a portion where the anode 2 and the cathode 3 overlap each other. The SOFC 1 includes the generation unit in plural (three generation units in this embodiment). Accordingly, the effective electrode area of the SOFC 1 becomes n×S2. Here, n is number of generation units included in the SOFC 1, and n equals 3 in this embodiment. The SOFC 1 has a layered structure where plural generation units are stacked, and this layered structure enables the whole effective electrode area of the SOFC 1 to be increased. Therefore, high current (power) may be obtained from the whole SOFC 1 regarding its volume. That is, the SOFC 1 may realize high power density compared to flat or tubular SOFCs even if they have the same volume. Consequently, the SOFC 1 may realize the miniaturization and enhance the generation efficiency as well.

The SOFC 1 also has a structure where the anode 2, the cathode 3, and the solid electrolyte 4, each having the thickness of several tens of micrometers, are stacked. Therefore, the SOFC 1 has a relatively little increase in thickness in a stacked direction even though the number of stacked layers is increased. Thus, since the SOFC 1 may have larger effective electrode area per unit volume compared to flat or tubular SOFC, a power density per unit volume is also increased, and resultantly the generation efficiency of the SOFC 1 is improved wholly.

The SOFC 1 has a deformation-resistant structure because the anode 2, the cathode 3, and the solid electrolyte 4 are integrally constructed to maintain the strength of the whole SOFC 1. Hence, even if the solid electrolyte 4 is formed in thin layer, the strength of the whole SOFC 1 may be sufficiently ensured by the plural anodes 2 and cathodes 3. Like this, the SOFC 1 has the structure that may easily generate higher electric current because it is easy to form the solid electrolyte 4 in thin layer. Consequently, the SOFC 1 enables the solid electrolyte 4 to be thin layer while securing the total strength, thus achieving the effect of reducing an operating temperature. Specifically, the SOFC 1 may generate sufficient current even in a temperature range of 300° C. to 600° C.

Also, the SOFC 1 may absorb thermal expansion in a short period because the SOFC 1 is configured with a stacked structure of the anode 2, the cathode 3, and the solid electrolyte 4, each having several tens of micrometers in thickness. Thus, crack in the anode 2, the cathode 3 or the solid electrolyte 4 may be effectively suppressed. In particular, in case where the anode 2 and the cathode 3 are formed of porous materials, pores absorb thermal expansion to relieve stress, and therefore the absorption effect of thermal expansion is increased. That is, since the porous anode 2 and the cathode 3 may increase the absorption effect of thermal expansion, the crack in the anode 2, the cathode 3 or the solid electrolyte 4 may be suppressed although the thermal expansion coefficients of the materials constituting the anode 2, the cathode 3 and the solid electrolyte 4 are not exactly the same.

Furthermore, since the SOFC 1 has the stacked structure of the anode 2, the cathode 3 and the solid electrolyte 4, a deflection caused by the thermal expansion is averaged so that large deformation rarely occurs locally. In the SOFC 1, each of the anode 2, the cathode 3 and the solid electrolyte 4 has a thickness of several tens of micrometers, and thus the total thickness (dimension in a stacking direction of the SOFC 1) of the SOFC 1 may be relatively thin even if number of stacked layers is increased. Accordingly, the temperature distribution in the thickness direction of the SOFC 1 is narrow, thereby minimizing total deflection amount. Because the anode 2, the cathode 3 and the solid electrolyte 4 of the SOFC 1 has the layered structure, and may be prepared by a process of stacking green sheets and a process of firing them at a high temperature, each of the anode 2, the cathode 3 and the solid electrolyte 4 may be thin. This leads to a decrease in total temperature distribution in the SOFC 1, which enables the deformation caused by the temperature distribution to be much smaller. Resultantly, the SOFC 1 is advantageous in that it is resistant to thermal expansion. Also, the SOFC 1 has advantages such as high temperature-responsibility and rapid starting-up, because the SOFC 1 is resistant to thermal expansion, and the smaller the size, the more uniform the overall temperature is.

FIG. 6 is a plan view illustrating a structure of an SOFC according to a modification of the embodiment. While an SOFC 1' of FIG. 6 is the same as the SOFC 1 of FIG. 5 in that its plan shape is a rectangle, the SOFC 1' differs from the SOFC 1 in that first and second electrodes 11' and 12' are formed at a long side of the rectangle. Since the first and the second electrodes 11' and 12' are formed at the long side of the rectangle in the SOFC 1' of FIG. 6, a distance between the first electrode 11' and the second electrode 12' is shorter than that of the SOFC 1 in FIG. 5. As a result, in the SOFC 1', dimensions of the anode 2 and the cathode 3 disposed in parallel with a direction oriented from the first electrode 11' to the second direction 12' may be smaller that those of the SOFC 1 in FIG. 5. Consequently, the SOFC 1 of FIG. 6 may be shorter than the SOFC 1 of FIG. 5 in a distance that the fuel F supplied from the first electrode 11' passes through the anode 2 toward the second electrode 12' and a distance that the oxygen A supplied from the second electrode 12' passes through the cathode 3 toward the first electrode 11'. Therefore, the SOFC 1' of FIG. 6 enables the fuel F and oxygen A to be more easily spread overall in comparison with the SOFC 1 of FIG. 5, thus further enhancing generation efficiency.

Figure 7:
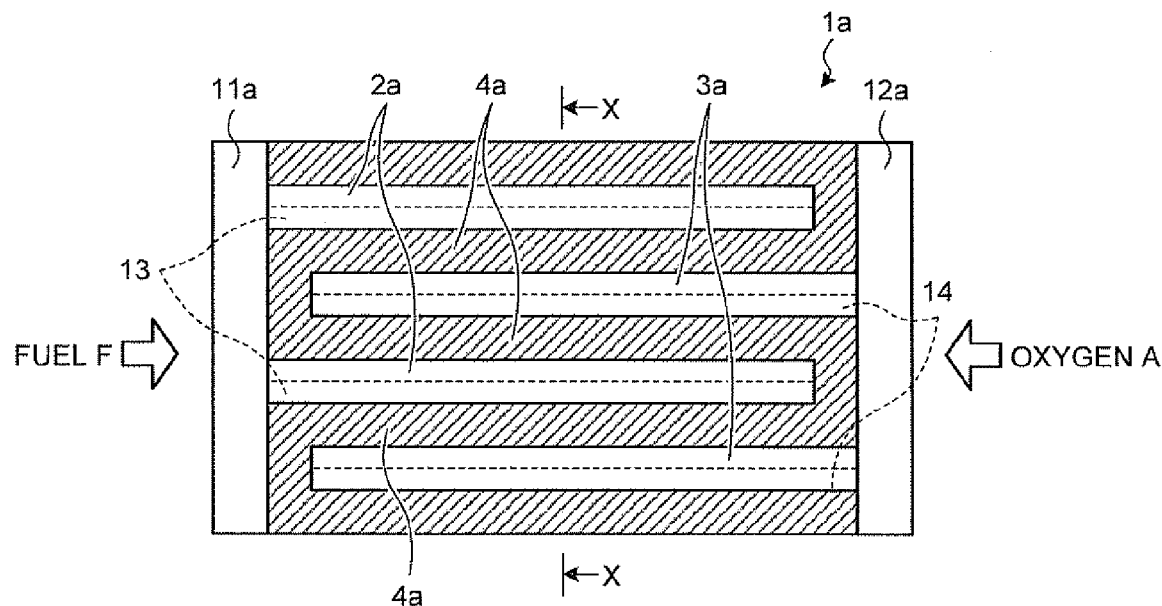
FIG. 7 is a cross-sectional view illustrating a structure of an SOFC according to another modification of the embodiment.
Figure 8:
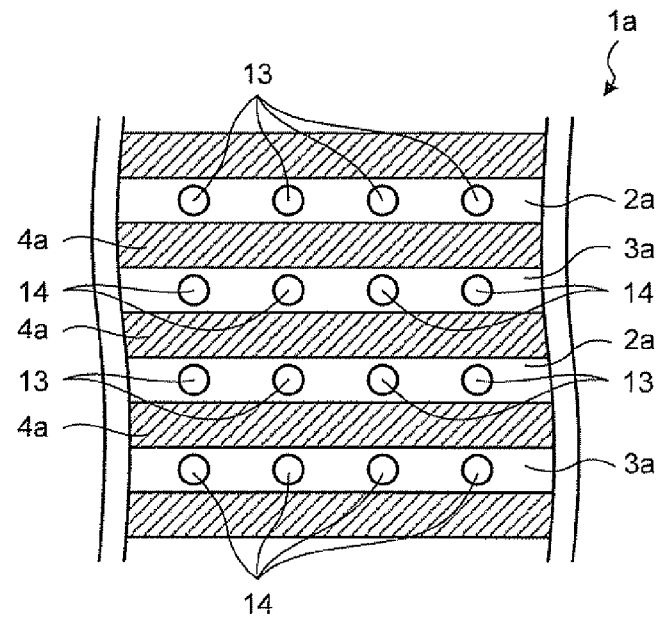
FIG. 8 is a cross-sectional view taken along line X-X of FIG. 7.

FIG. 7 is a cross-sectional view illustrating a structure of an SOFC according to another modification of the embodiment. FIG. 8 is a cross-sectional view taken along line X-X of FIG. 7. An SOFC 1a of this modification is almost similar to the SOFC 1, however, the SOFC 1a differs from the SOFC 1 in that passages for passing gas (hereinafter, referred to as gas passages) are installed in an anode 2a and a cathode 3a, respectively. The other constitutions are the same as the SOFC 1.

As illustrated in FIGS. 7 and 8, plural gas passages 13 are formed in the anode 2a of the SOFC 1a, and plural gas passages 14 are installed in the cathode 3a. The gas passages 13 and 14 are formed in a direction parallel with a direction oriented from a first electrode 11a to a second electrode 12a. In this modification, the gas passages 13 and 14 are opened from a portion where the first electrode 11a contacts the anode 2a and a portion where the second electrode 12a contacts the cathode 3a, respectively, however, do not tunnel the first and the second electrodes 11a and 12a. However, the gas passages 13 and 14 may tunnel the first and the second electrodes 11a and 12a.

Since the gas passages 13 and 14 are formed in the anode 2a and the cathode 3a, the fuel F and oxygen A do not only spread widely over the anode 2a and the cathode 3a, but also reach a solid electrolyte 4a easily. Accordingly, the SOFC 1a generates much power and also enhances generation efficiency. For example, in case where the anode 2a and the cathode 3a are formed using different materials or conditions, the fuel A and oxygen A may spread widely into the SOFC 1a although the gas passage is not formed in one of the anode 2a and the cathode 3a. In this case, the gas passage may be installed at a necessary side of the anode 2a and the cathode 3a, which reduces the time and effort to form the gas passage. Therefore, in this modification, the gas passage may be provided at least one side of the anode 2a and the cathode 3a.

Figure 9:
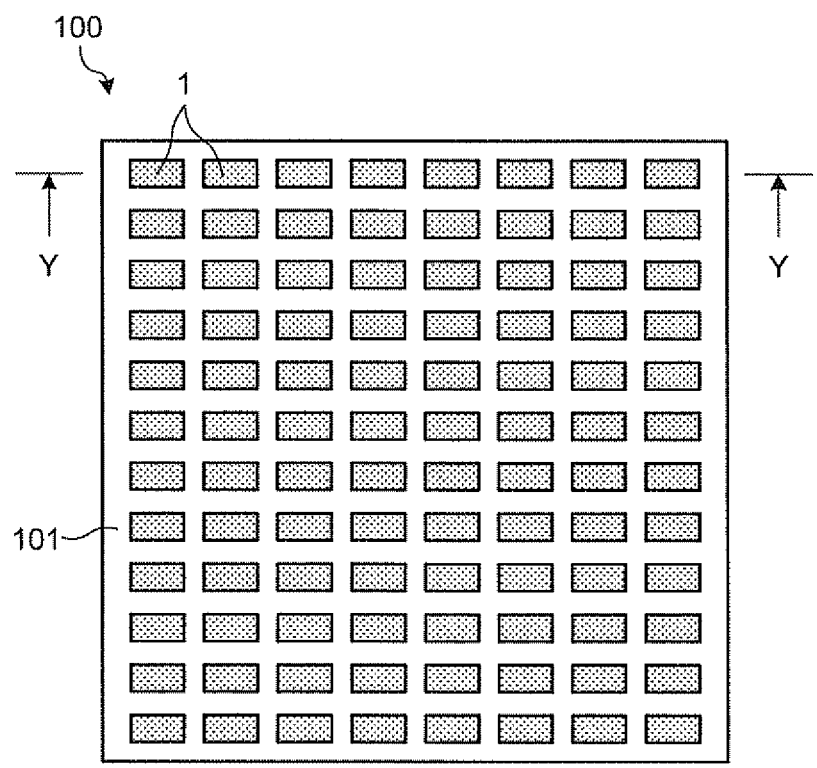
FIG. 9 illustrates an example of a generation unit configured with plural SOFCs according to the embodiment.
Figure 10:
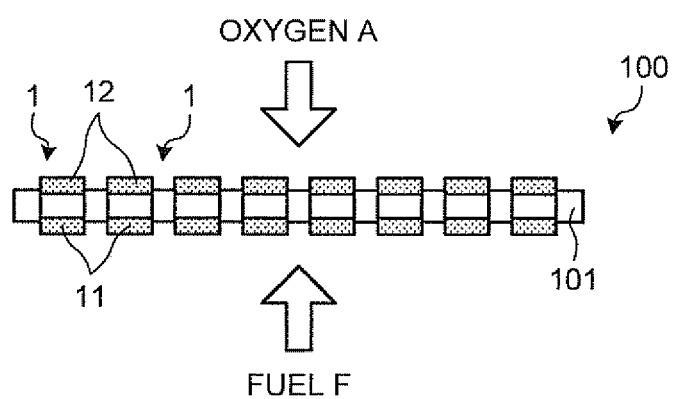
FIG. 10 is a cross-sectional view taken along line Y-Y of FIG. 9.

FIG. 9 illustrates an example of a generation unit configured with plural SOFCs according to an embodiment. FIG. 10 is a cross-sectional view taken along line Y-Y of FIG. 9. A generation unit 100 includes plural. SOFCs 1. Also, the generation unit 100 may include plural SOFCs illustrated in FIG. 6, or the SOFCs 1a illustrated in FIGS. 7 and 8. The plural SOFCs 1 are mounted on a substrate 101. As illustrated in FIG. 10, the first electrode 11 is disposed at one side of the substrate 101, and the second electrode 12 is disposed at the other side. The fuel F is supplied to the first electrode 11 of the substrate 101, and the oxygen A of the second electrode 12 is supplied to the second electrode 12, so that the plural SOFCs 1 operate to generate power.

In the SOFC 1, the first and the second electrodes 11 and 12 are disposed to face each other, and both of them are installed at both ends of the SOFC 1. Therefore, when the substrate 101 is installed between the first and the second electrodes 11 and 12, a fuel supplying side and an oxygen supplying side may be partitioned simply in the SOFC 1. Since the anode and cathode of the SOFC 1 may be simply and definitely separated, the generation unit 100 including the plural SOFCs 1 may be constructed simply and easily. As a result, a fuel-supplying system or an oxygen-supplying system may be constructed simply.

Also, a decrease in generation efficiency of the SOFC 1 is extremely small because mixing of the fuel F and oxygen A rarely occurs. Moreover, although the density of the plural SOFCs 1 is increased, the fuel F and oxygen A may be supplied from both sides of the SOFCs 1 with the substrate 101 disposed therebetween. Therefore, it is unnecessary to supply the fuel or oxygen to the SOFCs 1 one-by-one. Hence, when the generation unit 100 is configured with the plural SOFCs 1, it is easy to realize high densification of the SOFC 1. Afterwards, a method of manufacturing an SOFC will be described according to an embodiment.

Figure 11:
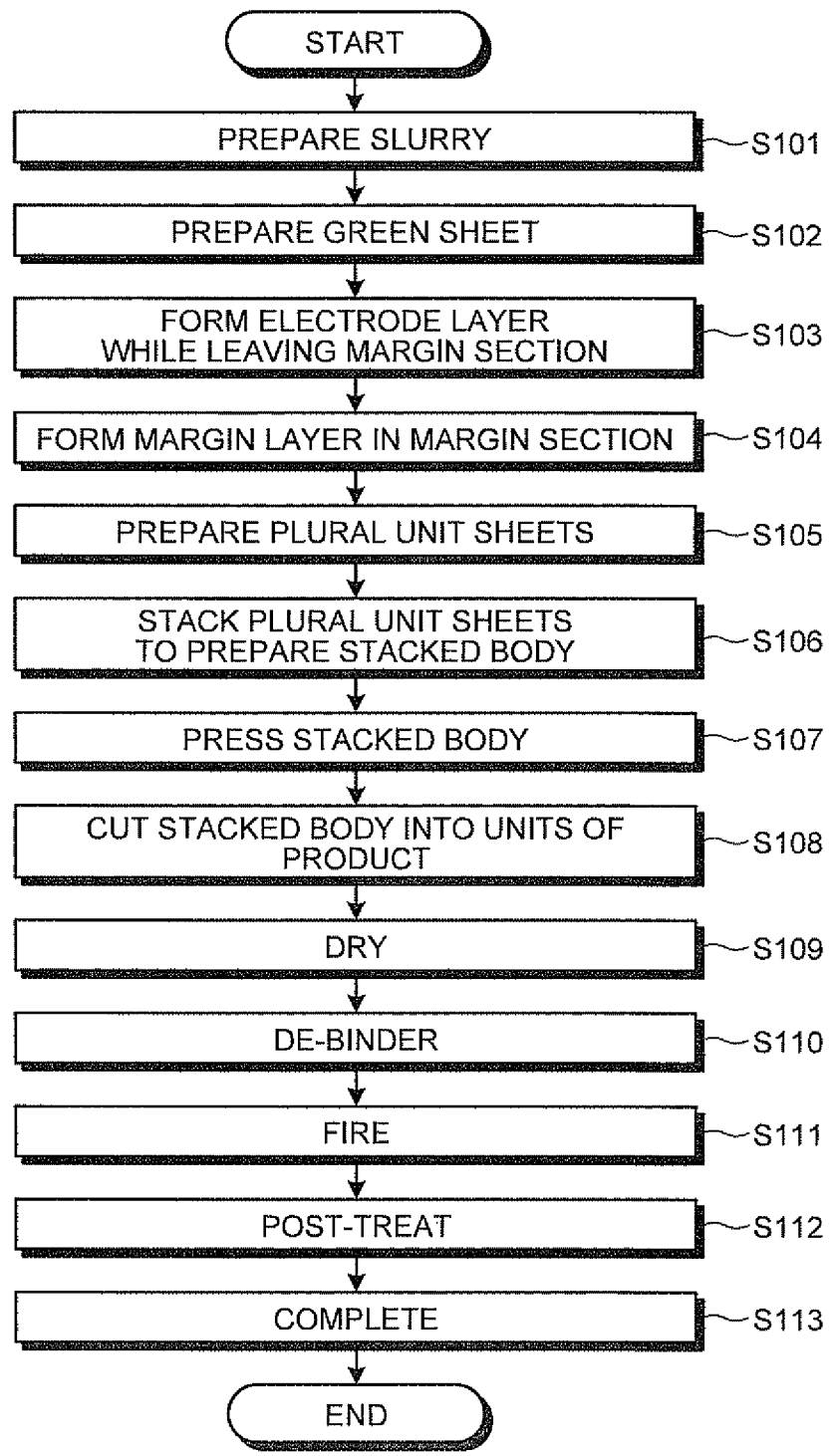
FIG. 11 is a flowchart illustrating a method of manufacturing the SOFC according to the embodiment.

FIG. 11 is a flowchart illustrating a method of manufacturing the SOFC according to the embodiment. FIGS. 12A through 17 illustrate a method of manufacturing an SOFC according to an embodiment. In case of manufacturing the SOFC 1 in FIG. 2, a unit sheet is prepared first, in which an electrode layer for forming the anode 2 and the cathode 3, and a margin layer for forming partitioning sections 5a and 5c are formed on a green sheet for forming the solid electrolyte 4. The unit sheet is stacked in plurality to thereby form a stacked body, and thereafter the stacked body is cut to a dimension of one product unit, and then dried. The stacked body after being dried is fired to thereby form the SOFC 1.

First, a slurry (solid electrolyte slurry) used to form the solid electrolyte and a slurry (electrode slurry) used to form the anode 2 and the cathode 3 are prepared (step S101). The solid electrolyte slurry may be obtained by putting raw material powder of the solid electrolyte 4 into a nylon pot together with milling balls, and then mixing with solvent, binder, and plasticizer for 10 to 20 hours. While amounts of the solvent, binder and plasticizer are not limited, for example, the amount of the solvent may be set to a range of 10 mass % to 50 mass %, and the amount of the binder may be set to a range of 1 mass % to 10 mass %. If necessary, a dispersant or the like may be added into the slurry in an amount of 10 mass % or less.

The electrode slurry is prepared by mixing conductive powder particles and a pore-forming agent, and then adding them with a solvent and a binder. While amounts of the solvent and binder are not limited, for example, the amount of the solvent may be set to a range of 10 mass % to 50 mass %, and the amount of the binder may be set to a range of 1 mass % to 10 mass %. If necessary, a dispersant or the like may be added into the electrode slurry in an amount of 10 mass % or less.

The solvents used to prepare the solid electrolyte slurry and the electrode slurry may include an organic solvent such as acetone, toluene, isobutyl alcohol, methyl ethyl ketone, and terpineol. The binder may include, for example, a butyral-based resin and an acryl-based resin. The raw powder of the solid electrolyte is a powder of a material for the solid electrolyte, and the conductive powder particle is a powder of a material for the anode and cathode. In this embodiment, SDC powder was used as the raw powder of the solid electrolyte, and Pt powder was used as the conductive powder particle for both of the anode and cathode. The pore-forming agent used for the electrode slurry may use a material susceptible to be combusted during the firing process, for example, an acryl-based polymer. By the use of the pore-forming agent which is combusted during the firing process, porous anodes or cathodes may be manufactured simply.

After the solid electrolyte slurry and the electrode slurry are obtained, a green sheet (non-fired sheet) is prepared using the solid electrolyte slurry (step S102). For example, the solid electrolyte slurry is applied onto a support 30 of a polyester film or the like illustrated in FIG. 12A using, for example, a doctor blade method, thereby preparing a green sheet 20 having a thickness of 1 μm to 100 μm.

Thereafter, an electrode layer 21 is formed on the obtained green sheet 20, wherein a margin section 22 is left (step S103). For example, the electrode slurry is printed on the surface of the green sheet 20 illustrated in FIG. 12A through a screen printing or the like, and then dried to prepare the electrode layer 21 having a thickness of 10 μm to 100 μm. In this embodiment, a dimension h of the margin section 22 between neighbored electrode layers 21 is about two times the dimension of each of the partitioning sections 5a and 5c in a direction (hereinafter, referred to as an electrode extension direction) parallel with a direction oriented from the first electrode 11 to the second electrode 12 illustrated in FIG. 2. Also, the arrow N in FIG. 12A denotes the electrode extension direction. It is preferable that the margin section 22 is formed in at least the electrode extension direction. In this embodiment, the margin section is also formed in a direction crossing the electrode extension direction.

Here, a half of a distance between the neighbored electrode layers 21 with respect to the electrode extension direction, that is, a dimension h of the margin section 22 equals the dimension of each of the partitioning sections 5a and 5c in the electrode extension direction. While the partitioning sections 5a and 5c are made by a margin layer formed in the margin section 22, which will be described later, the electrode layer 21 or the margin layer is formed through a screen-printing or the like. Thus, edges of the margin layer or the electrode layer 21 are not sharply formed, and therefore the margin layer and the partitioning sections 5a and 5c may be incompletely formed when the dimension h of the margin section 22 is small in the electrode extension direction.

To avoid this, it is preferable that the dimension h of the margin section 22 between the neighbored electrode layers 21 with respect to the electrode extension direction should be two times or more to the thickness of the electrode layer 21. Consequently, the partitioning sections 5a and 5c may have sufficient dimensions in the electrode extension direction corresponding to the thickness of the electrode layer 21. Resultantly, the partitioning sections 5a and 5c are reliably formed, which may avoid the leakage of electrons or gas between the anode and cathode more reliably.

Figure 12A:
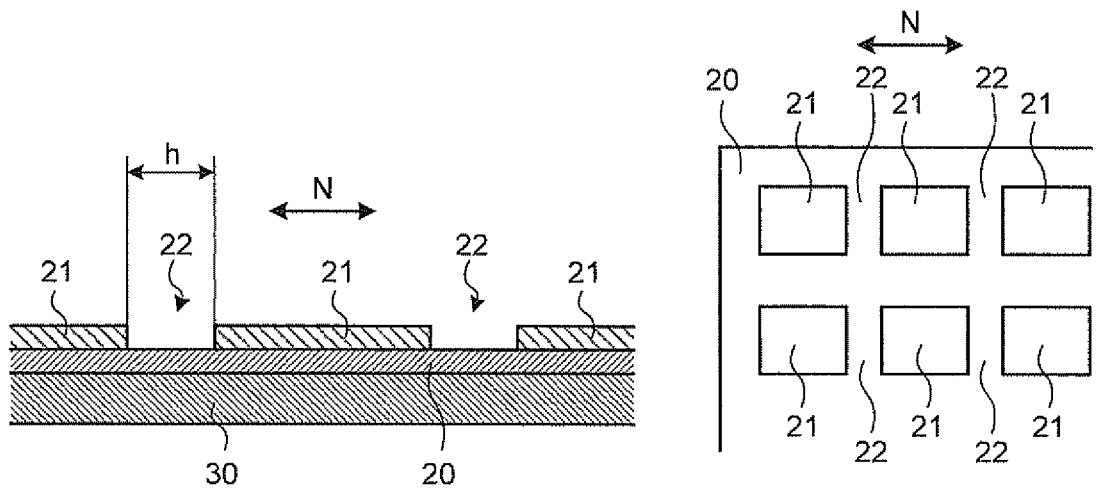
FIG. 12A illustrates a method of manufacturing the SOFC according to the embodiment.
Figure 12B:
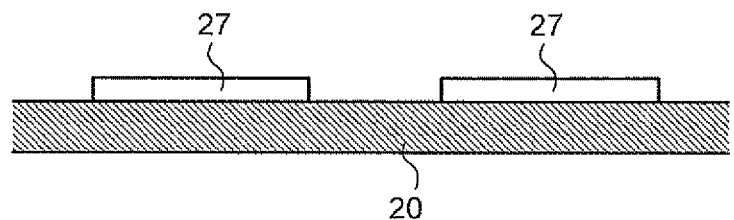
FIGS. 12B to 12D illustrate a method of manufacturing an SOFC according to the another modification of the embodiment.
Figure 12C:
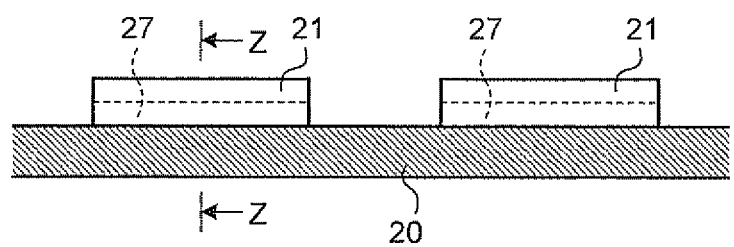
Figure 12D:
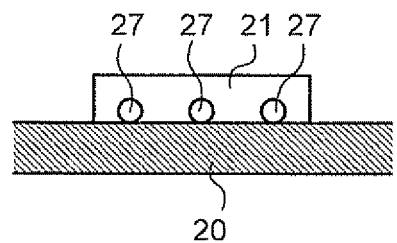

FIGS. 12B through 12D illustrate an example of a process of manufacturing the anode 2a and the cathode 3a constituting the SOFC 1a in FIGS. 7 and 8. As illustrated in FIG. 12B, predetermined number of gas passage forming agents 27 for forming gas passages are provided on a surface of the green sheet 20. The gas passage forming agent 27 may be the same material as the pore-forming agent, and may be the same shape as the internal shape of gas passage. For example, as illustrated in FIG. 8, the gas passage forming agent 27 has a tubular shape in case where the sectional shape of the gas passage is a circle.

Thereafter, as illustrated in FIGS. 12O and 12D, the electrode layer 21 is formed on the gas passage forming agent 27 over the green sheet 20, while the margin section 22 is still left remaining. FIG. 12D is a cross-sectional view taken along line Z-Z of FIG. 12C. Since the electrode layer 21 is formed on the gas passage forming agent 27, the gas passage forming agent 27 is formed inside the electrode layer 21. The gas passage forming agent 27 is combusted during a firing process, and therefore gas passages may be simply formed in the anode and cathode.

Figure 13:
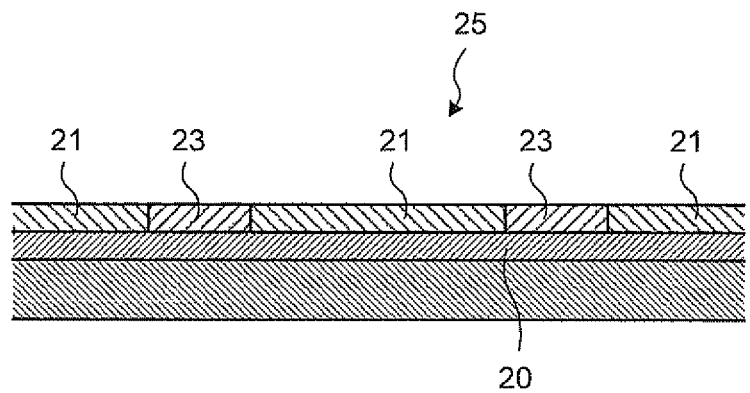
FIG. 13 illustrates the method of manufacturing the SOFC according to the embodiment.

Afterwards, as illustrated in FIG. 13, a margin layer 23 is formed in the margin section 22 (FIG. 12A) (step S104). This is used to form the partitioning sections 5a and 5c illustrated in FIG. 2, and to reduce a stepped portion between the electrode layers 21. The margin layer 23 is formed by printing a margin slurry through the screen-printing process and drying. In this embodiment, because the partitioning sections 5a and 5c are formed of the same material as the solid electrolyte 4 in FIG. 2, the solid electrolyte slurry is used as the margin slurry. The printing on the margin section 22 may be performed by adjusting the viscosity of the margin slurry, or a screen-printing plate or printing times of screen-printing, according to a desired thickness of the margin layer 23.

Also, when the partitioning sections 5a and 5c are formed of different material from the solid electrolyte 4, the margin slurry is prepared separately from the solid electrolyte slurry. In this case, the margin slurry is prepared by adding a solvent and a binder into raw powder particles for the partitioning sections 5a and 5c. The added amounts of the solvent and binder are not limited, however, they, for example, may be set such that the amount of the solvent ranges from 10 mass % to 50 mass %, and the amount of the binder ranges 1 mass % to 10 mass %. The solvent and binder, which may be used to prepare the margin slurry, are the same as those used in the preparation of the solid electrolyte slurry.

Figure 14:
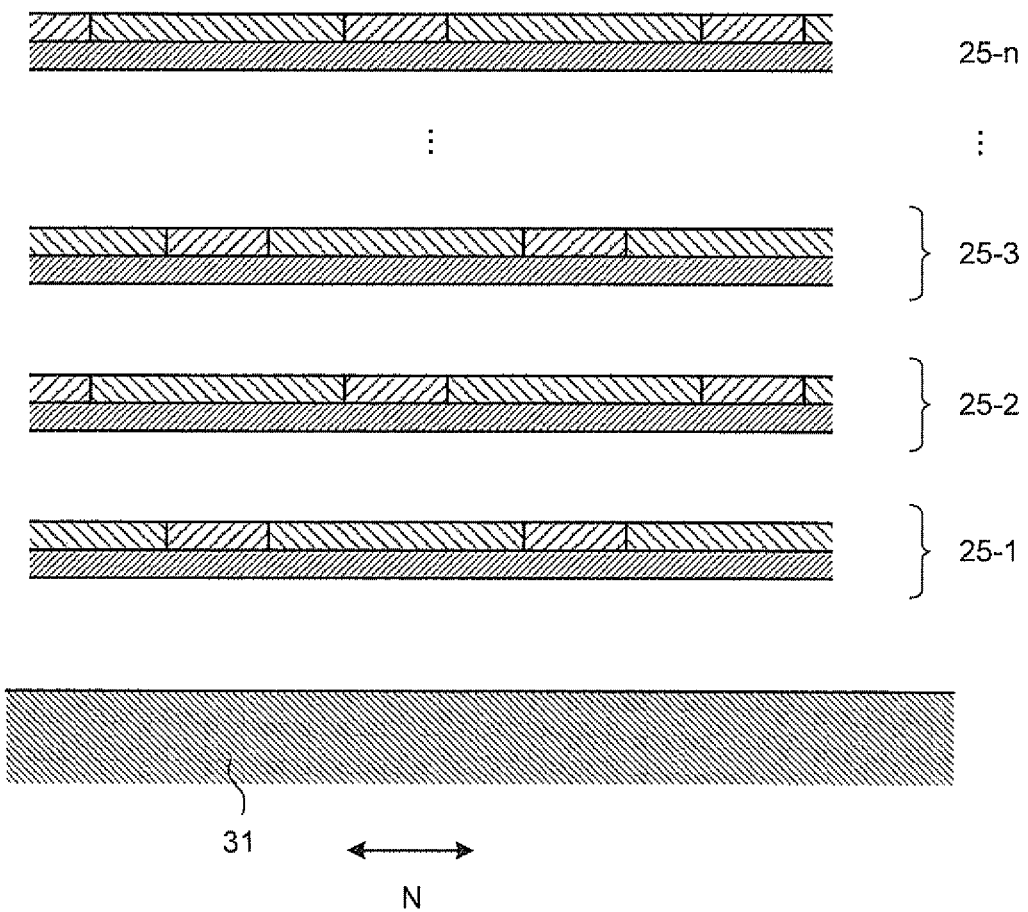
FIG. 14 illustrates the method of manufacturing the SOFC according to the embodiment.

Through the above-described process, a unit sheet 25 where the electrode layer 21 and the margin layer 23 are formed on the green sheet 20 is manufactured, as illustrated in FIG. 13. Here, the unit sheet 25 is manufactured in plurality (step S105). Thereafter, as illustrated in FIG. 14, the plural unit sheets 25-1, 25-2, 25-3, . . . , and 25-n are stacked on a stack die 31 to thereby form a stacked body 26 illustrated in FIG. 15 (step S106). Herein, the arrow N of FIG. 14 denotes the electrode extension direction. Numbers 1, 2, 3, . . . , n, which are written next to the reference numeral 25 indicating the unit sheet, represent the number of the stacked unit sheets 25.

In case where the plural unit sheets 25-1 and 25-2 are stacked, the stacked body is structured such that the neighbored unit sheets 25-1 and 25-2 or neighbored unit sheets 25-2 and 25-3 in the electrode extension direction N do not overlap each other alternately. Also, in this embodiment, upon the uppermost unit sheet (for example, unit sheet 15-4 in FIG. 15), that is, the unit sheet that is finally stacked during the stacking process of the plural unit sheets, the green sheet 20 is disposed, as illustrated in FIG. 15.

Figure 15:
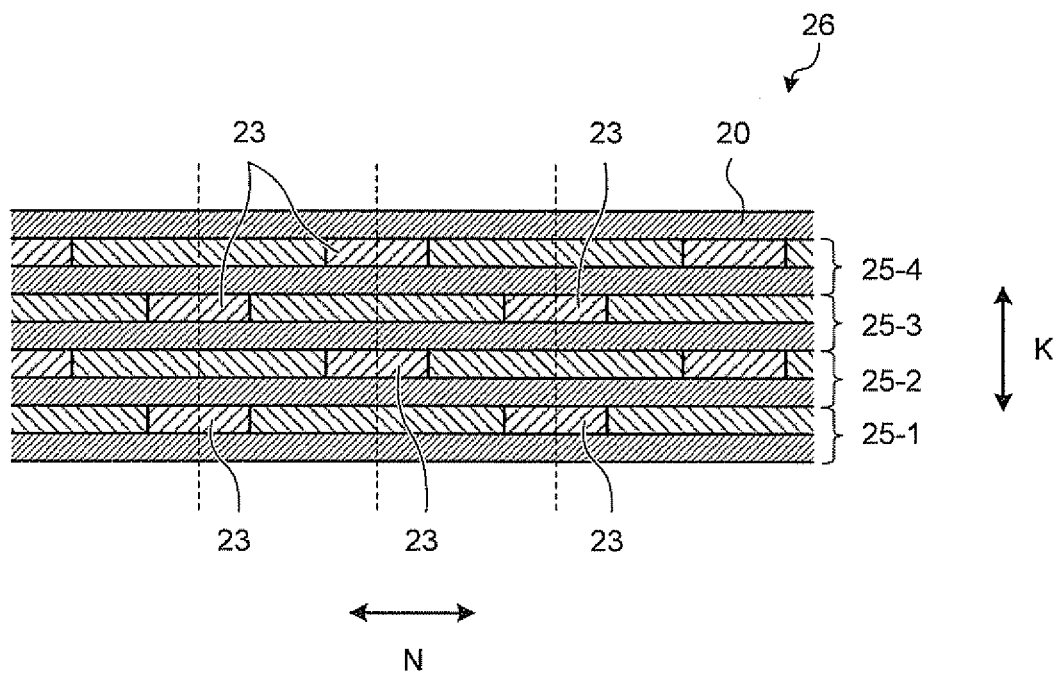
FIG. 15 illustrates the method of manufacturing the SOFC according to the embodiment.
Figure 16:
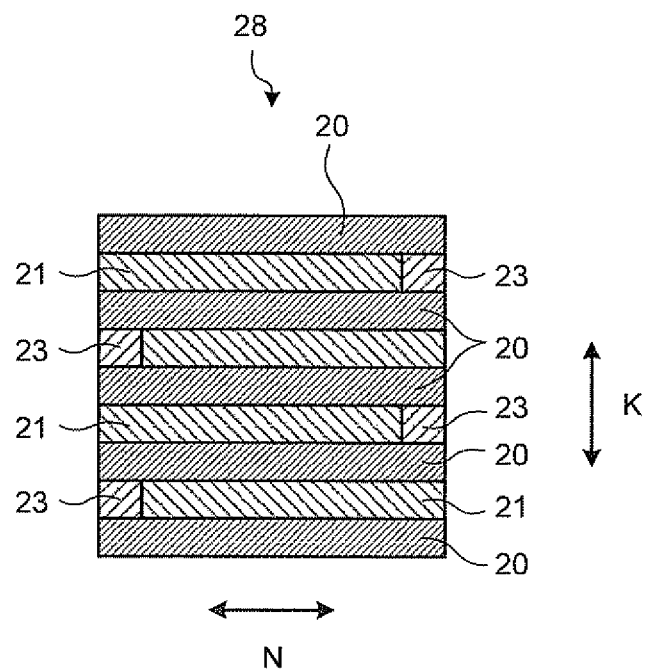
FIG. 16 illustrates the method of manufacturing the SOFC according to the embodiment.

Subsequently, the stacked body 26 of FIG. 15 is pressed in a stacked direction (direction indicated by the arrow K in FIG. 15) (step S107). Accordingly, the plural unit sheets 25 are integrally formed through pressing. Thereafter, the stacked body 26 is cut in units of one product, i.e., one SOFC 1 (step S108). In this embodiment, the stacked body 26 is cut along a central section (dotted line of FIG. 15) of the margin layer 23 in the electrode extension direction N, and also cut along the central section of the margin layer in a direction perpendicular to the electrode extension direction N. As a result, a product unit stacked body 28 is obtained, as illustrated in FIG. 16. As illustrated in FIG. 16, in the product unit stacked body 28, the electrode layer 21 is exposed at both sides thereof in the electrode extension direction N, and exposed alternately in the stacked direction K. Opposite sides to the exposed sides of the electrode layer 21 are sealed inside the product unit stacked body 28 by means of the margin layer 23 and the green sheet 20.

Afterwards, the product unit stacked body 28 is dried (step S109), and a de-binder is performed (step S110). Then, the product unit stacked body 28, which has undergone the drying and de-binder processes, is fired at a high temperature (step S111), thereby obtaining a sintered body of the product unit stacked body 28. The product unit stacked body 28 is the sintered body that the anode, cathode, solid electrolyte, and the partitioning sections are sintered into one sintered body.

Conditions for the de-binder and firing processes of the product unit stacked body 28 may differ according to materials of the solid electrolyte or materials for the electrode. However, for example, when the product unit stacked body 28 in which Pt particle is used for the electrode layer 21) is fired, the binder is removed from the product unit stacked body 28 by heating the product unit stacked body for 1 to 2 hours at 400° C. to 600° C. in air atmosphere. Afterwards, the product unit stacked body 28 is fired for 3 to 5 hours at 1,350° C. to 1,500° C. in air atmosphere, thus obtaining a sintered body. The sintered body of the product unit stacked body 28 may undergone a post-treatment if necessary (step S112). For example, the post-treatment includes an annealing treatment in air atmosphere. Resultantly, as illustrated in FIG. 17, the SOFC 1 is completed (step S113), in which the anode 2, the solid electrolyte 4 and the cathode 3 are alternately stacked, and the partitioning sections installed between the neighbored solid electrolytes 4 are integrally formed through the firing process.

Figure 17:
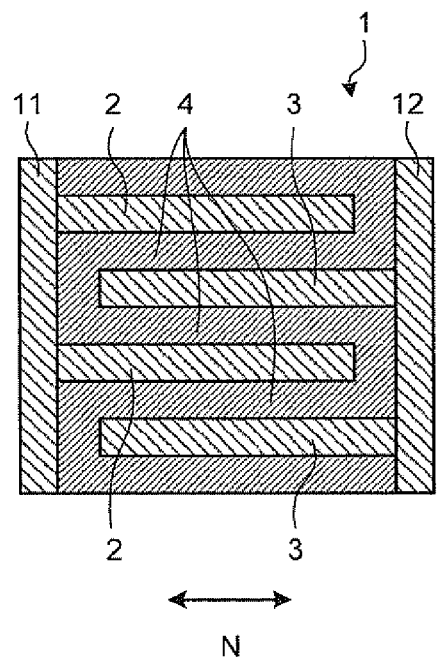
FIG. 17 illustrates the method of manufacturing the SOFC according to the embodiment.

According to the above procedure, the first and the second electrodes 11 and 12 are not formed, and thus the first and the second electrodes 11 and 12 are formed at both sides of the SOFC 1 in the electrode extension direction N, as illustrated in FIG. 17. For example, the electrode slurry is applied at both sides of the SOFC in the electrode extension direction N, then dried and de-hindered, and fired under predetermined conditions. Hence, the first electrode 11 electrically connected to the plural anodes 2 and the second electrode 12 electrically connected to the plural cathodes 3 are integrally formed through the sintering process, thereby completing the SOFC 1 further including the first and the second electrodes 11 and 12. According to the method of manufacturing the SOFC in accordance with the embodiment, since the manufacturing process is relatively simple and even smaller device may be simply manufactured, the small-sized SOFC 1 may be manufactured at low cost.

Power Generation Test

Figure 18:
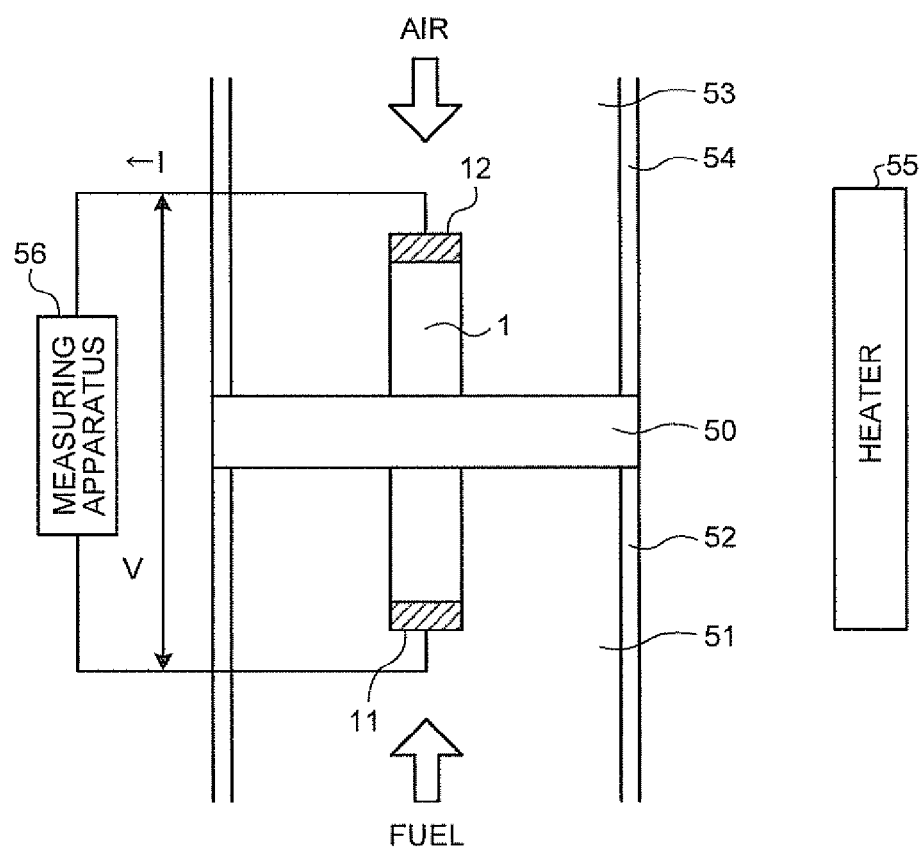
FIG. 18 illustrates a method of evaluating the SOFC according to the embodiment.

FIG. 18 illustrates a method of evaluating the SOFC according to the embodiment. The SOFC 1 manufactured according to the above-described method operates in such a way that the anode side, i.e., the first electrode 11 side, and the cathode side, i.e., the second electrode 12 side are placed in different spaces, respectively. The SOFC 1 is mounted on a specimen support plate 50. On the specimen support plate 50, an anode cover 52 is mounted at a side of the first electrode 11, and a cathode cover 54 is mounted at a side of the second electrode 12. The anode cover 52 and the cathode cover 54 are partitioned by the specimen support plate 50. A space at a side of the first electrode 11 becomes a fuel supplying space 51, and a space at a side of the second electrode 12 becomes an oxygen supplying space 53. Also, a heater 55 is disposed at an outer side of the SOFC 1, and the SOFC 1 is heated by the heater 55 during the generation test.

Before the test, a helium (He) gas is flowed at a flow rate of 50 cc/min and the ambient temperature of the SOFC 1 is risen up to 850° C., and a contact between the SOFC 1 and the specimen support plate 50, and the anode side of the SOFC 1, i.e., the first electrode 11 side are sealed. A leakage at the cathode side, i.e., the second electrode 12 side, was confirmed to be 100 ppm or less by monitoring a gas composition at the anode side using a quadrupole mass-spectrometer, and thereafter the ambient temperature of the SOFC 1, which is equal to an operating temperature, was decreased to a temperature of 500° C. to 600° C. After reaching a test temperature, a mixtured gas containing 95% argon (Ar) and 5% hydrogen (H2) was supplied to the anode at a flow rate of 20 cc/min, and air was supplied to the cathode at a flow rate of 100 cc/min. Under this circumstance, a voltage V and current I between the cathode and anode of the SOFC 1 were measured.

The voltage V and current I between the cathode and anode of the SOFC 1 were measured using a measuring apparatus 56. The measuring apparatus 56 used is a potentio-galvanostat. In actual measurement, an open-circuit voltage (potential of the SOFC 1 in a state the current does not flow) was measured as an initial value, a current was then increased by every 25 μA under a predetermined current condition, and a voltage at each current was measured. The test temperature was 500° C., 550° C., and 600° C., respectively, and power was obtained even at any temperature. This verifies that the SOFC 1 functions as a fuel cell.

Figure 19:
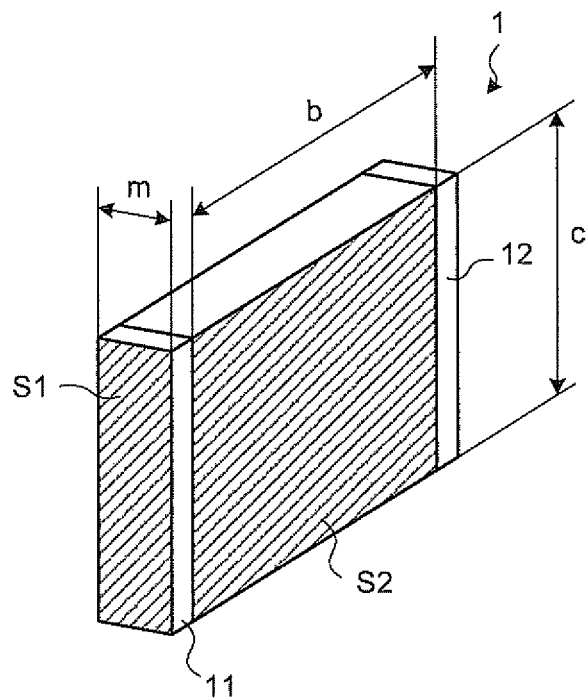
FIG. 19 is a perspective view illustrating an area of a portion supplying fuel or oxygen in an SOFC according to an embodiment.
Figure 20:
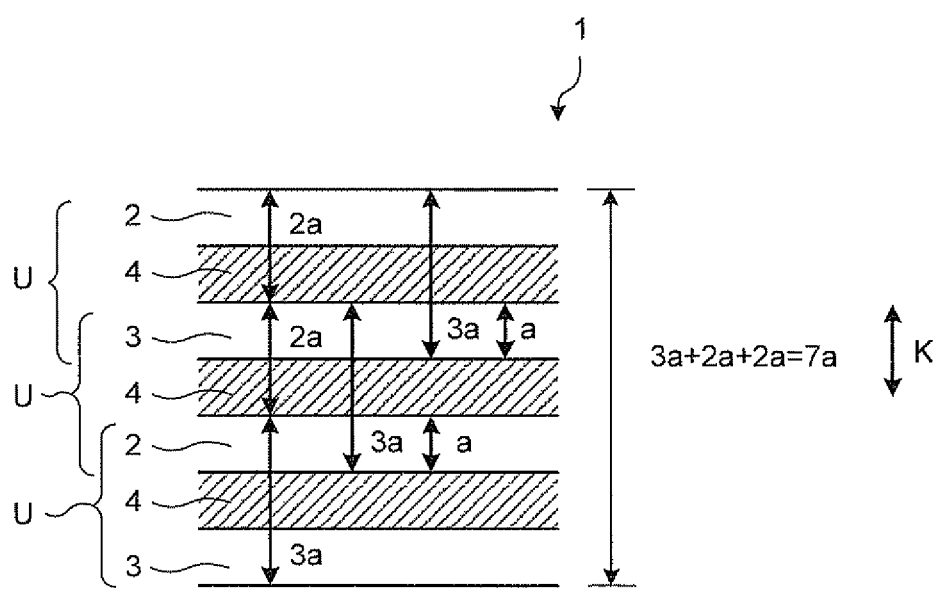
FIG. 20 is a partial cross-sectional view illustrating a structure of an SOFC according to an embodiment.

FIG. 19 is a perspective view illustrating an area of a portion supplying fuel or oxygen in an SOFC according to an embodiment. FIG. 20 is a partial cross-sectional view illustrating a structure of an SOFC according to an embodiment. In the SOFC 1, the fuel is supplied to the first electrode 11, and the oxygen is supplied to the second electrode 12. Therefore, the area of the portion of supplying the fuel or oxygen is S1 that is an area of the first electrode 11 or the second electrode 12.

As illustrated in FIG. 20, the anode 2, the solid electrolyte 4, and the cathode 3 in the SOFC 1 form one generation unit U. In the SOFC 1 of FIG. 20, the SOFC 1 has three generation units U. In the SOFC 1, each of the anode 2, the solid electrolyte 4, and the cathode 3 has a thickness of a. Since the anode 2 or cathode 3 of the SOFC 1 is commonly used between the neighbored generation units U, the dimension of the SOFC 1 in the stacked direction K becomes 3×a+2×a+2×a=7×a. If the number of the generation units U is n, the dimension of the SOFC 1 in the stacked direction K is 3×a+2×a×(n−1)=a×(2×n+1).

The area (gas-supplying area) S1 of the portion of supplying the fuel and oxygen in the SOFC 1 equals m×c from FIG. 19. Here, m may be approximated to the dimension of the SOFC 2 in the stacked direction K, and thus m equals 2×a×(n+1). Assuming that the power generated by the generation unit U is W and the SOFC 1 has n number of the generation units U, the power generated by the SOFC 1 is n×W. Therefore, the power density of the SOFC 1 is Wρ1=n×W/S1 based on the gas-supplying area S1, which is expressed as Equation (1) below.

$$W\rho 1 = n \times W / (a \times (2 \times n+1) \times c) \tag{1}$$

Figure 21:
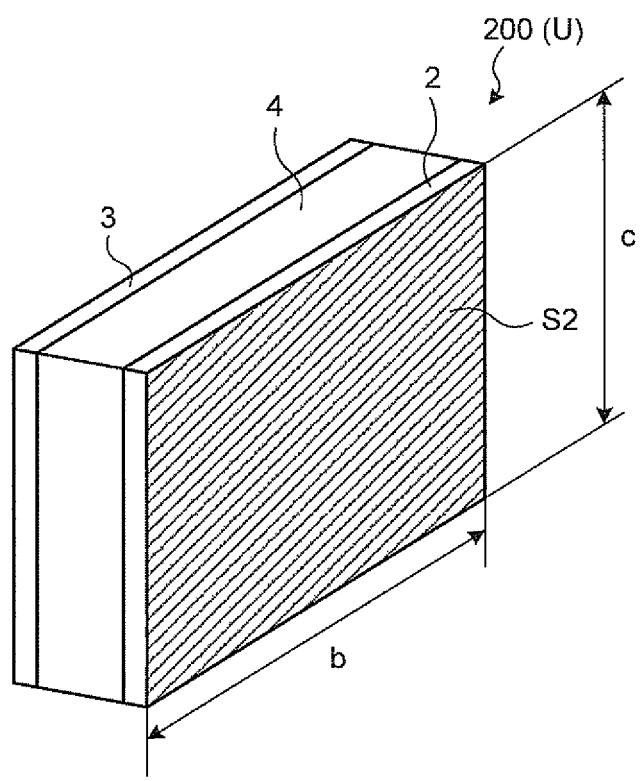
FIG. 21 is a perspective view when regarding one generation unit of an SOFC according to an embodiment as a flat SOFC.

FIG. 21 is a perspective view when regarding a single generation unit of an SOFC according to an embodiment as a flat SOFC. The effective electrode area of the single generation unit U of the SOFC 1 is S2=b×c. This is regarded as the flat SOFC, and the power density Wρ1 of the SOFC 1 having the stacked structure is compared with the power density of the flat SOFC. When the generation unit U of FIG. 21 is regarded as a flat SOFC 200, the effective electrode area S2 becomes the area (gas supplying area) of a portion of supplying the fuel and oxygen to the flat SOFC 200. As described above, the power generated by the flat SOFC 200 is W because the power generated by the generation unit U is W. Accordingly, the power density of the flat SOFC 200 (Wρ2) is expressed as Equation (2) below.

$$W\rho 2 = W / (b \times c) \tag{2}$$

The ratio of Wρ1 to Wρ2 equals (b/a)×(n/(2×n+1))=(b/a)×(1/(2+1/n)). If b=4,000 μm and a=50 μm, b/a=80. If n=3, Wρ1/Wρ2=80/1/(2+⅓)=34.3. From this result, the SOFC 1 having the layered structure has power density which is 34.3 times that of the flat SOFC 200 based on the gas-supplying area. Also, since the value of 1/(2+1/n) approaches to ½ as the number n of the power units U increases, Wρ1/Wρ2 approaches to b×a/2. As such, the SOFC 1 has higher power density than the flat SOFC 200.

In order for the flat SOFC 200 to secure the power density as high as the SOFC 1 having the layered structure, it is necessary to increase the effective electrode area S2. As a result, the flat SOFC 200 is poor against thermal expansion and decreases in bending strength. Meanwhile, the SOFC 1 of the layered structure may be smaller in size than the flat SOFC even if they have the same power density, and therefore the SOFC 1 has high bending strength.

Furthermore, a volume V1 of the SOFC 1 illustrated in FIG. 19 becomes S1×b=a×(2×n+1)×c×b. Accordingly, the power density per unit volume of the SOFC 1 (Wρv1) is expressed as Equation (3) below.

$$W\rho v1 = n \times W / (a \times (2 \times n+1) \times c \times b) \tag{3}$$

Each of the anode 2, the solid electrolyte 4, and the cathode 3 of the flat SOFC 200 illustrated in FIG. 21 has a thickness of a, and thus a volume V2 of the flat SOFC 200 is S2×3×a=3×a×b×c. Therefore, the power density per unit volume of the flat SOFC 200 (Wρv2) is expressed as Equation (4) below.

$$W\rho v2 = W / (3 \times a \times b \times c) \tag{4}$$

The ratio of Wρv1 to Wρv2 equals 3×(n/(2×n+1))=3×(2+1/n). If n=3, Wρv1/Wρv2=9/7=1.29. From this result, the SOFC 1 having the layered structure has a power density which is 1.29 times that of the flat SOFC 200. Also, the value of Wρv1/Wρv2 approaches to 3/2 as the number n of the power units U increases. As such, the SOFC 1 has higher power density per unit volume than the flat SOFC 200 due to its layered structure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A solid oxide fuel cell, comprising:
   a plurality of solid electrolytes;
   a plurality of anodes sandwiched by each of the plurality of solid electrolytes and a plurality of cathodes sandwiched by each of the plurality of solid electrolytes, the plurality of anodes and the plurality of cathodes being alternately stacked on each other in a stacked direction, and
   a plurality of first partitioning sections sandwiched by each of the plurality of solid electrolytes and a plurality of second partitioning sections sandwiched by each of the plurality of solid electrolytes, the plurality of first and second of partitioning sections being alternately stacked on each other in the stacked direction and being staggered in a direction perpendicular to the stacked direction, wherein each of the plurality of anodes has one end exposed and another end contacting a corresponding first partitioning section in the direction perpendicular to the stacked direction, each of the plurality of cathodes has one end contacting a corresponding second partitioning section and another end exposed in the direction perpendicular to the stacked direction, fuel is supplied from the exposed one ends of the plurality of anodes towards the another ends of the plurality of anodes, air is supplied from the exposed another ends of the plurality of cathodes towards the one ends of the plurality of cathodes, and the supplying directions of the fuel and air are opposed to each other so that the fuel and air flow countercurrent to each other throughout the solid oxide fuel cell.

2. The solid oxide fuel cell according to claim 1, wherein each of the plurality of first and second partitioning sections is made of the same material as each of the plurality of solid electrolytes.

3. The solid oxide fuel cell according to claim 1, wherein each of the plurality of first and second partitioning sections is made of a material having electronic conductivity lower than each of the plurality of solid electrolytes.

4. The solid oxide fuel cell according to claim 1, wherein the plurality of anodes and/or the plurality of cathodes are porous.

5. The solid oxide fuel cell according to claim 1, wherein a gas passage is installed inside at least one of the plurality of anodes and the plurality of cathodes.

6. A solid oxide fuel cell, comprising:
a plurality of solid electrolytes;
a plurality of anodes sandwiched by each of the plurality of solid electrolytes and a plurality of cathodes sandwiched by each of the plurality of solid electrolytes, the plurality of anodes and the plurality of cathodes being alternatively stacked on each other in a stacked direction;
a plurality of first partitioning sections sandwiched by each of the plurality of solid electrolytes and a plurality of second partitioning sections sandwiched by each of the plurality of solid electrolytes, the plurality of first and second partitioning sections being alternatively stacked on each other in the stacked direction and being staggered in a direction perpendicular to the stacked direction, a first electrode electrically connected to the plurality of anodes; and a second electrode electrically connected to the plurality of cathodes and provided on an opposite side of the first electrode in the direction perpendicular to the stacked direction, wherein each of the plurality of anodes has one end exposed and another end contacting a corresponding first partitioning section in the direction perpendicular to the stacked direction, each of the plurality of cathodes has one end contacting a corresponding second partitioning section and another end exposed in the direction perpendicular to the stacked direction, and fuel is supplied from a side of the first electrode and air is supplied from a side of the second electrode.

7. The solid oxide fuel cell according to claim 6, wherein each of the plurality of first partitioning sections connects the solid electrolytes which are adjacent to each other via each of the plurality of anodes and each of the plurality of second partitioning sections connects the solid electrolytes which are adjacent to each other via each of the plurality of cathodes.

8. The solid oxide fuel cell according to claim 6, wherein each of the plurality of first and second partitioning sections is made of the same material as each of the plurality of solid electrolytes.

9. The solid oxide fuel cell according to claim 6, wherein each of the plurality of first and second partitioning sections is made of a material having electronic conductivity lower than each of the plurality of solid electrolytes.

10. The solid oxide fuel cell according to claim 6, wherein the plurality of anodes and/or the plurality of cathodes are porous.

11. The solid oxide fuel cell according to claim 6, wherein a gas passage is installed inside at least one of the plurality of anodes and the plurality of cathodes.

* * * * *